May 23, 1933.　　　R. N. CHAMBERLAIN　　　1,910,280
METHOD OF MAKING NONREACTIVE LEAD POWDER
Filed April 26, 1930　　2 Sheets-Sheet 1
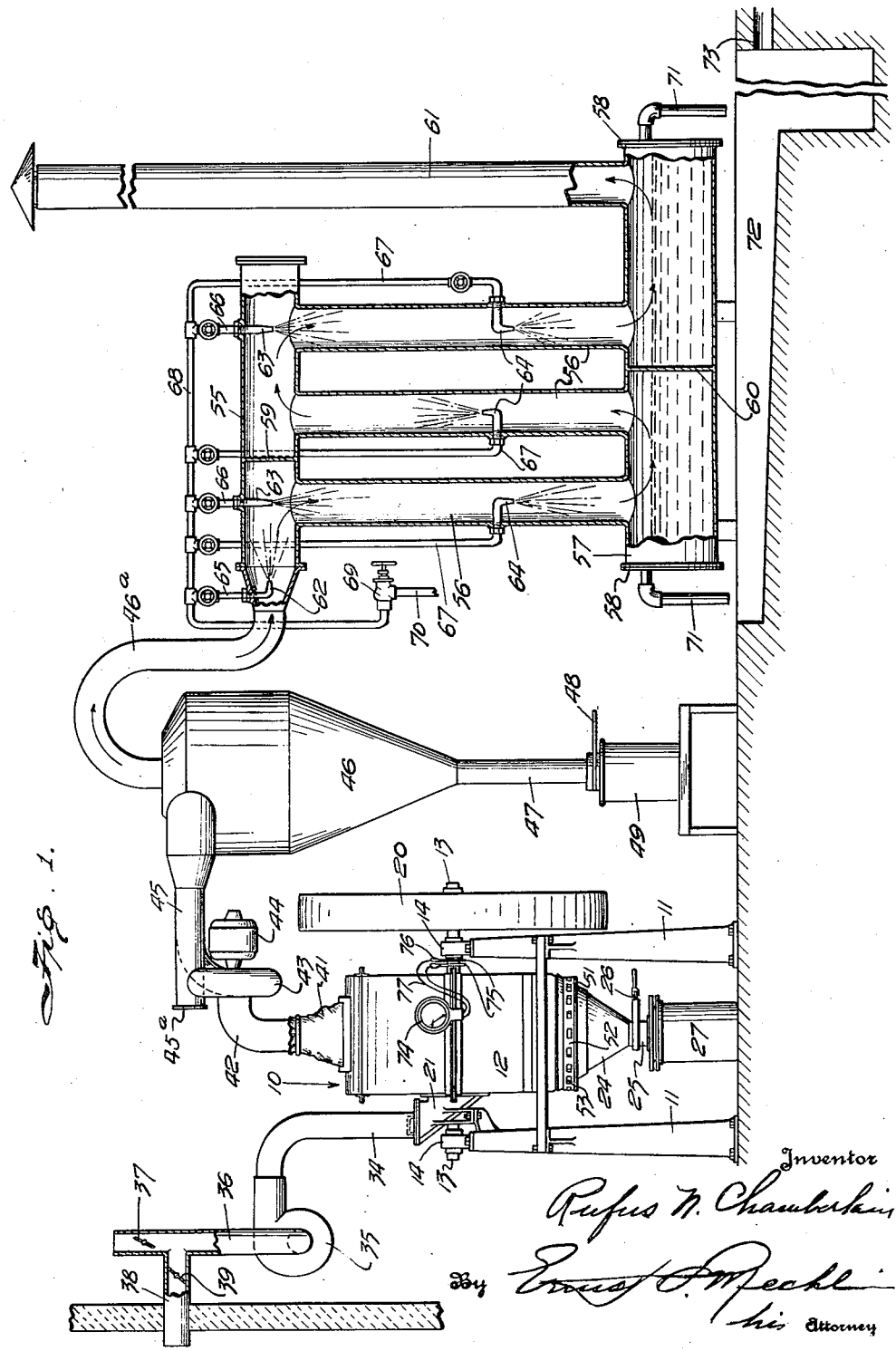

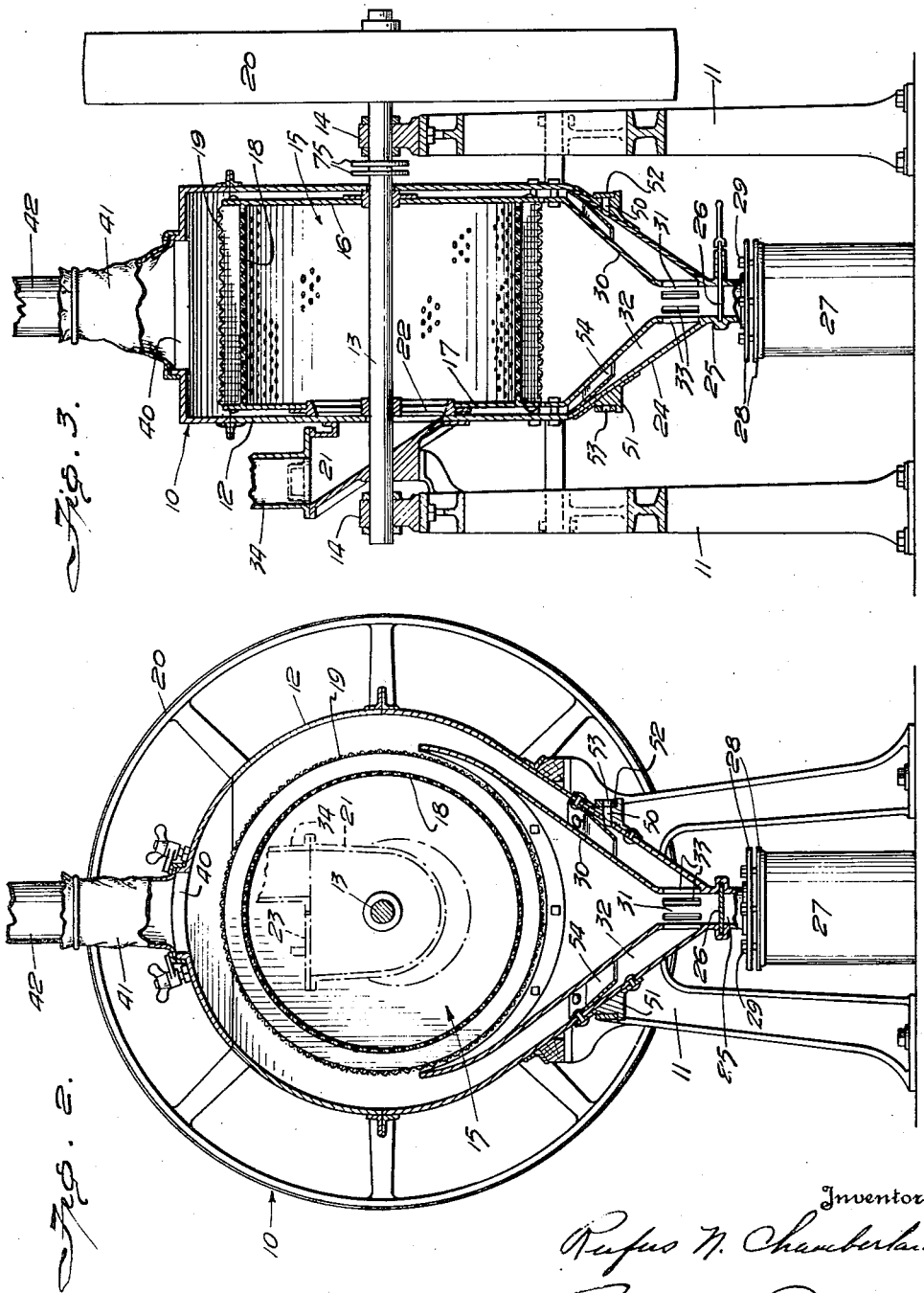

Patented May 23, 1933

1,910,280

UNITED STATES PATENT OFFICE

RUFUS N. CHAMBERLAIN, OF CHICAGO, ILLINOIS, ASSIGNOR, BY MESNE ASSIGNMENTS, TO GOULD STORAGE BATTERY CORPORATION, OF DEPEW, NEW YORK, A CORPORATION OF DELAWARE

METHOD OF MAKING NONREACTIVE LEAD POWDER

Application filed April 26, 1930. Serial No. 447,572.

The invention relates to the manufacture of non-reactive lead powder and this application is a continuation in part of my application for patent for Method of making lead powder, filed October 19th, 1928, Serial No. 313,501.

The principal object of the invention, generally stated, is to provide a method of producing finely divided or pulverulent lead material characterized by containing the minimum quantity of sub-oxide and which will therefore be chemically inert or substantially non-reactive and therefore well suited for use in the manufacture of storage battery plates, for instance in the manner set forth in my co-pending application for patent for Storage battery plate material, filed March 7th, 1930, Serial No. 434,172, in which application I have disclosed the use of an inert metallic lead powder, with possibly a small unintentional percentage of lead sub-oxide and/or oxide with litharge made into a paste by the admixture of dilute sulphuric acid of proper strength for employment in the manufacture of storage battery plates, the use of such lead powder being advantageous on account of its cheapness as compared with the materials produced by the roasting process.

I am well aware of the fact that efforts have been made to make a lead powder but heretofore the product obtained has been highly reactive on account of the preponderating quantity of the sub-oxide. Of course there are numerous oxides of lead differing from one another in the number of atoms of oxygen per molecule. In accordince with known methods of manufacture it has been the practice to place regular or irregular shaped pieces, fragments or balls of lead in a drum or cylinder which is rotated to bring about an abrasive action between the various pieces of lead and between the pieces of lead and the periphery of the container, small particles of the lead being consequently ground off by attrition, the particles being subsequently collected. However, this operation has always been carried out in such manner and under such conditions as regards temperature, contact with air, etc., that the lead within the mill has oxidized very rapidly, in fact to such an extent that after being abraded the pieces of lead have become practically immediately coated with oxide so that to all intents and purposes it is practically only the film or oxide coating which has been ground off. As the quantity of oxygen, in the form of air, in such a mill is necessarily limited the resultant powder obtained from the carrying out of the process has been found to be lead sub-oxide expressed by the formula $Pb_2O$. This material when discharged from a mill and coming into contact with the atmosphere is quickly oxidized still further and absorbs an additional atom of oxygen which converts it into lead monoxide expressed by the formula $PbO$. This lead sub-oxide produced in the manner mentioned is considered to be and in fact really is extraordinarily reactive and must be handled with the utmost care to prevent it from oxidizing further and being converted into the monoxide. Perhaps for the sake of clearness it might be well to explain that if a few drops of water be sprinkled upon a mass of lead sub-oxide or if a red hot wire or the like be contacted therewith further oxidation occurs very rapidly, in fact so quickly and violently that the mass becomes aglow. If the material be permitted to combine with oxygen in this manner before being reduced to paste form it is considered very unsatisfactory for the manufacture of battery plates, especially the positives. In accordance with an outstanding process for the manufacture of a so-called lead powder there has been obtained a product containing from 93 to 97% of lead suboxide and about 3 to 7% of free metallic lead. Such a composition is inconvenient and even dangerous to handle and make practical commercial use of on account of the extreme care required in its handling and storage.

In contradistinction to known methods, it is a more specific object of the present invention to provide a method of making a stable and more nearly true lead powder, that is to say one in which the free or metallic lead constitutes actually from 45 to 65% of the mass and the lead oxides from 45 to 25% and probably not over 10% of the reactive sub-oxide, it having been found throughout a long series of experiments that a material of this character is really non-reactive or inert and may therefore be stored without any unusual precautions, even for a comparatively long period of time, and handled and treated freely without danger of sudden oxidation with possible evolution of heat and fire hazzard.

Another object of the invention is to provide a method of making non-reactive lead powder by abrading lead pieces in a rotary mill and controlling the temperature and quantity of air obtaining access to or in contact with the lead prior to, during and after abrasion, such conditions being variable in accordance with the quantity of material being worked upon, room temperature, speed of rotation of the drum, etc., to achieve the ultimate result of producing the material desired in which the free or inert pulverulent metallic lead predominates.

Another specific object of the invention is to provide a method of making a non-reactive lead powder involving the step of cooling the drum or rotating mill to keep down the temperature by dissipating the heat generated by the friction of the lead pieces against one another and against the inner surface of the drum or mill together with the heat produced by the chemical union of oxygen from the air with the lead, the maintenance of the temperature below a certain more or less critical degree avoiding the possibility of excessive and undesired oxidation of the lead and formation of the reactive sub-oxide.

In my co-pending application for patent for apparatus for making non-reactive lead powder I have disclosed and claimed an apparatus for accomplishing the desired result but for the sake of clearness in the explanation of the carrying out of the method, the disclosure of said co-pending application is embodied herein. Such being the case, reference is had to the accompanying drawings in which:

Figure 1 is a general view, mostly in elevation and partly in section, illustrating a complete apparatus for carrying out the method constituting the subject matter of the present application, Figure 2 is a vertical cross sectional view through the grinding or abrading mill, and Figure 3 is a sectional view therethrough taken at right angles to Figure 2.

At the very outset it should be understood that I am not limited to the employment of any specific apparatus for the successful carrying out of my method though what is shown has proved to be highly satisfactory for the purpose. Referring to the drawings it will be observed that I have disclosed means for producing lead powder and a series of means for collecting and salvaging the same, certain of the means being of minor or secondary importance and provided principally for the purpose of keeping the lead powder out of the atmosphere and thereby safeguarding the health of the workmen. Of cource the various instrumentalities will be described in detail. The actual powder producing means is preferably a rotary mill in which suitable pieces of lead are tumbled about to grind off particles by attrition. A very efficient type of mill for this purpose is well illustrated in the drawings and is designated as a whole by the numeral 10. This mill is here shown as comprising a suitable supporting frame 11 upon which is mounted, by any suitable attaching means, braces and the like, a stationary casing or shell 12 through which extends a shaft 13 journaled in suitable bearings 14 on the frame. Within the shell the shaft has suitably fixed thereto for rotation therewith a drum 15 including sides 16 and 17 of disk form having secured thereto concentric peripheral members 18 and 19, the former being a perforated metallic cylinder and the latter being preferably a wire screen. There is no exact limitation as to the size of the perforations in the cylinder though one-eighth inch in diameter has been found to be a very satisfactory size, and, similarly, there is no precise limitation as to the mesh of the screen though it may well correspond substantially to the perforations. The drum is intended to be rotated by any suitable means and the shaft is therefore shown as equipped with a pulley 20 which is adapted to be engaged by a power belt. Any other appropriate drive mechanism can of course be employed if preferred. Logically the shell or casing 12 must be formed of sections to permit assembly but details in this respect are immaterial.

The lead pieces or balls to be ground are introduced through a hopper 21 which communicates through openings 22 with the interior of the cylinder 18. These openings 22 are very easily provided by making the side 17 of the drum of spider-like construction as clearly indicated in Figure 3. Ordinarily the top of the hopper is intended to be sealed by a cover 23 which may, however, be removed if desired and which of course must be removed when introducing a fresh supply of lead pieces.

The lower portion of the casing or shell 12 is of hopper shape, as indicated at 24, and terminates in a constricted discharge neck 25 equipped with a slide or cut-off 26 and intended to have placed beneath it the receptacle 27 to receive the powdered material passing through the two walls of the drum. The neck 25 is disclosed as carrying a pair of spaced disks 28, the lower one of which is intended to engage upon the top of the receptacle. The reason for the space between the disks is to permit entry of air and the width of the space may be varied by adjusting screws 29 provided for the purpose. Suitably mounted within the lower portion 24 of the shell or casing is a hopper shaped combined guide and guard 30 having a neck portion 31 joined to the neck portion 25. This combined guide and guard is spaced away from the portion 24 of the casing, the space being indicated by the numeral 32, and this space communicates with the interior of the necks 31 and 25 through a series of openings 33. The space between the disks 28 provides for the entry of air to the interior of the drum and the hopper 21 also provides for the same when the cover 23 thereof is removed.

Other air supply means for the interior of the drum is shown as comprising a conduit 34 connected with the hopper 21 and leading to a blower 35 to which is connected a pipe 36 communicating with the room in which the apparatus is located and equipped with a damper 37. A branch pipe 38 communicating with the air outdoors connects with the pipe 36 and is equipped with a damper 39. By this arrangement air at room or outdoor temperatures may be introduced within the drum, the flow being of course materially increased when the blower 35 is in operation.

At its top the shell or casing 12 has an outlet opening 40 with which is suitably connected a flexible coupling or conduit 41 connected to an outlet pipe 42 which leads to a blower 43 driven, as by an electric motor 44, and connected with a flue 45 equipped at one end with a removable cap 45$^a$ for clean-out purposes and having its other end leading to a cyclone separator 46 of any ordinary or preferred type, not shown in detail as being conventional. The bottom of the cyclone separator is tapered and leads to a discharge pipe 47 equipped with a cut-off or slide 48 and beneath which is disposable a receptacle 49 for receiving the major portion of the lead dust which does not pass into the receptacle 27.

Means for admitting air around and about the drum for the purpose of cooling the same is here shown as comprising a plurality of openings 50 formed in a member 51 surrounding the lower portion 24 of the casing 12. These openings communicate with the space 32 and are adapted to be controlled by a shutter ring 52 rotatable upon the member 51 and provided with openings 53 adapted to be brought to a greater or less extent into registration with the openings 50. To prevent any lead dust from escaping through the openings 50 and for insuring that air entering through these openings will contact with and circulate about the member 30, there is provided a shield or apron 54 mounted inside the shell or casing above the openings 50 and projecting downwardly beyond the same in an inclined position and in spaced relation to the lower portion 24 of the casing.

The heaviest particles of lead powder accumulate in the receptacle 27 and the major portion of the remainder will be reclaimed or salvaged by the cyclone separator. However, even such a separator is not capable of removing or saving all of the finest particles which when dispersed in air produce the effect of gray smoke. The actual value of this impalpable dust is comparatively slight but as it would be very detrimental to the health of the workmen if breathed, I make provision for its recovery, the means shown comprising a horizontal flue 55 connected with the outlet pipe 46$^a$ of the separator and connected with the upper ends of a series of vertical flues 56 which connect at their lower ends with a tank 57 having manhole covers 58 at its ends for clean-out purposes. The horizontal flue 55 is provided with a transverse partition 59 between the first and second vertical flue 56, and the tank 57 is provided with a partition 60 between the second and third vertical flues so that the dust issuing from the cyclone separator must take a circuitous course, downwardly through the first vertical flue 56, upwardly through the next, and then downwardly through the last. A stack 61 leading to the atmosphere communicates with the tank 57. Located within the inlet end of the horizontal flue 55 is a fog or spray nozzle 62 discharging axially thereof, and extending into the flue transversely thereof are vertically arranged fog or spray nozzles 63 discharging downwardly into the first and last vertical flues 56. Within the flues 56 are also other spray nozzles 64 discharging axially thereof in the direction of passage of air and dust therethrough. All the nozzles 62, 63 and 64 are connected by valved pipes 65, 66 and 67, respectively, with a common or manifold pipe 68 connected in turn through a valve 69 with a supply pipe 70 connected with a suitable water supply source. Of course the spray from the various nozzles will accumulate within the tank 57 and the latter is therefore provided at each end with an overflow pipe 71 discharging into a sump 72 having an overflow 73 leading to the sewer.

In the operation, the lead pieces or balls are introduced through the hopper 21, subsequent to the removal of the cover 23 and pass through the openings 22 into the interior of the drum. The extent to which the drum is thus filled of course varies with the desired output, the contemplated speed of rotation of the drum and the contemplated rate of inlet of air. The drum is then rotated at the desired speed by whatever drive means is provided for the purpose. When starting, the cover 23 and the dampers 37 and 39 and openings 50 may be closed and kept so until the temperature within the drum reaches a certain degree approaching that at which the method is carried out most successfully, the temperature being ascertainable by inspection of a meter 74 of the electric recording type mounted on the exterior of the mill and connected with a pyrometer, not shown, located within the drum, an operative connection between the meter and pyrometer being through collector rings 75 on the shaft 13 and engaged by contact brushes 76 connected by wires 77 with the meter, the collector rings being of course connected with the pyrometer. In actual practice I have discovered that the most efficient temperature for carrying out the method with a normal charge of lead pieces or balls within the mill is in the neighborhood of 110° C. Clearly the temperature will vary if the charge of lead be greater or less. The temperature within the drum is bound to rise, partly on account of the generation of heat by friction of the lead pieces one against another and against the perforated cylinder 18. Even at the beginning of the operation the suction blower or fan 43 is intended to be in action. As the drum rotates, the lead pieces are tumbled about therein and as they rub against one another and against the inner periphery of the perforated cylinder 18, and particularly against the edges of the perforations therein small particles of lead will be ground off and will pass out through the perforations and through the meshes in the wire screen 19, the heavier particles falling through the member 30 into and through the neck 31 and being deposited within the receptacle 27. Whatever particles fly beyond the upper edges of the member 30 will pass down through the space 32 and through the openings 33 into the neck 25 and thence into the receptacle. When the can or other receptacle becomes full, the slide 26 is closed, the can removed and sealed to exclude air and foreign matter in dust from circulating air, and another can placed in position.

Particles which float within the space about the drum are drawn out by the suction fan 43 through the opening 40, flexible member 41 and conduit 42 and discharged into the flue 45 and thence into the cyclone separator 46. The heavier particles salvaged within the cyclone separator pass through the pipe 47 into the receptacle 49 which, when filled, is replaced by another while the slide 48 is temporarily closed. The light impalpable dust which varies depending upon the atmosphere but probably constitutes no more than an average of one half to one per cent of the product passes out through the pipe 46ª into the flue 55 and flues 56 where the various sprays will operate to throw down the lead particles which will then of course accumulate within the compartmented tank 57. The amount of material unreclaimed after this washing process is permitted to escape through the stack 61. The matter reclaimed by the washing process accumulates within the tank 57 while the water overflows through the pipes 71. When the tanks become filled the contents may be removed by taking off the manhole covers 58. Solid matter which may be carried by the water through the pipes 71 may be reclaimed in the sump 72.

After the device has been in operation with the air inlets closed and the temperature has risen as above mentioned, it is intended that the shutter ring 52 be shifted to uncover the openings 50 to a greater or less extent. The suction fan 43 will then draw air from the room through the openings 50 into the space 32 and this air will of course pass upwardly and around the periphery and sides of the drum 15 and out to the cyclone separator. This air will, in its passage, absorb heat from the drum and its contents and consequently keep the temperature down below the critical point at which the lead will oxidize rapidly. While throughout the operation thus far described reference has been made to particles of lead, it should of course be understood that it is impossible to obtain absolutely free lead as there is bound to be a certain admixture of lead oxide or/and sub-oxide as there is a certain amount of air present within the drum which will oxidize the surfaces of the lead pieces as particles are ground off. Air entering through the openings 50 as above described will have but little oxidizing effect on the lead as it passes about the exterior of the drum, but a certain amount of air will enter the drum by passing through the space between the disks 28, neck 25, neck 30 and through the lowermost portion of the screen 19 as the latter rotates.

In case of necessity when additional cooling is needed, as for example when the action is speeded up to increase the output or the quantity of the charge within the drum is increased, additional air may be admitted to the interior of the drum by opening either the damper 37 or the damper 39, depending upon whether air at indoor or outdoor temperature is desired, or by opening both dampers. A still greater increase in air flow can be brought about by setting the blower 35 in operation so that a forced as well as suction draft through the drum will be brought about. Even though this additional air is introduced within the drum it will not have an undue oxidizing effect upon the lead owing to the fact that the openings 22 where the air enters are above at least the major portion of the mass of lead pieces within the drum and will carry out the hot air within the upper portion of the drum without necessarily contacting to any great extent with the lead. By properly regulating the speed of rotation of the drum and the air flow outside the drum as well as through the same it should be apparent that the temperature within the drum may be easily regulated and kept substantially constant especially with the aid of the meter giving the pyrometer readings. Naturally, the temperature may and probably will fluctuate to a limited extent but I have found that an average of 110° C. is very satisfactory. With this temperature I have found that the product collected in all three stages of the apparatus will contain 45% and usually considerably more metallic lead with, actually, perhaps approximately 7% of sub-oxide therewith and the remainder monoxide. As the sub-oxide is the only part of the product which is reactive it is apparent that the mass of material considered as a whole is inert or non-reactive and may therefore be stored and handled with ease and safety and without danger of a rapid additional oxidation which would convert the mass into the monoxide alone, or substantially alone, which I find is not satisfactory for the making of storage battery plates. My product does not respond to the usual and well known tests for lead sub-oxide as it will not ignite or oxidize rapidly either spontaneously or upon slight provocation.

From the foregoing description and a study of the drawings it will be apparent that I have provided a very simple and easily carried out method for producing substantially inert lead powder and one in which every provision has been made for effecting the necessary control of the operating conditions to meet variations in the quantity of lead worked upon, the desired rate of output and variations in atmospheric temperature or room temperature conditions. Ample provision has also been made for salvaging practically every possible portion of the output so that the method may be carried out in accordance with the dictates of efficiency and economy. It is thought that the method steps and the apparatus used in connection with the carrying out thereof will be readily understood by one skilled in the art without further explanation.

While I have shown and described a preferred embodiment of the invention in so far as the detailed steps and sequence thereof are concerned, it should be understood that this matter is illustrative and not limitative. For example I consider that two very important steps are first: cooling the mill or the mass of lead therein, and second: regulating the quantity or proportion of oxygen, in the form of air, permitted to act upon the lead masses and particles, the purpose in both instances being to avoid any great degree of oxidation of the lead so that the reactive sub-oxide, will not be formed to any considerable extent. In the carrying out of my method I have described the use of an air flow or draft, produced either by suction or blower effect, or both, for effecting the cooling. It should be distinctly understood that some other means may be resorted to for effecting cooling. For effecting cooling and at the same time limiting or preventing any great oxidation of the lead it is conceivable that a gas other than air may be circulated through and about the rotating drum, such substituted gas being of a character incapable of reacting with lead. Such gases are well known to chemists and it is not believed necessary to specify any particular one as they will suggest themselves. In fact I reserve the right to make all such changes in the method steps and sequence thereof as will constitute no departure from the spirit of the invention or the scope of the claims hereunto appended.

Having thus described the invention, I claim:

1. The method of forming finely divided substantially inert lead powder, comprising introducing lead pieces within a rotating drum, abrading the said pieces within the drum, maintaining the temperature of the material within the drum at a point below that at which a preponderant amount of lead oxide and sub-oxide mixture will be formed, and discharging the lead powder into a container.

2. The method of forming a finely divided substantially inert lead powder, comprising introducing lead pieces within a rotary drum, rotating the drum to abrade the pieces, cooling the drum and its contents to compensate for the heat generated by chemical and frictional action therewithin, discharging the lead powder so formed into a container, and substantially excluding atmospheric air from the lead powder during its discharge and subsequently thereto.

3. The method of forming a finely divided relatively inert lead powder which comprises continually abrading lead masses in the presence of a limited amount of oxygen, and cooling the mass to compensate for the heat generated by friction and oxidation and to limit the rate of oxidation so that the metallic powder abraded off will be in excess of the mixture of lead oxide and sub-oxide formed.

4. The method of making lead powder comprising grinding off particles thereof by attrition, regulating the quantity of oxygen permitted to contact with the lead and controlling the temperature to limit oxidation whereby the resultant product will contain a preponderant amount of free metallic lead powder.

5. The method of making lead powder comprising grinding off particles thereof by attrition, regulating the quantity of oxygen permitted to contact with the lead and controlling the temperature to limit oxidation whereby the product will contain less than 10% of lead sub-oxide.

6. The method of making lead powder comprising grinding off particles thereof by attrition, regulating the quantity of oxygen permitted to contact with the lead and controlling the temperature to limit oxidation whereby the product will contain substantially 50% or more of free metallic lead and therefore be inert and non-reactive.

7. The method of making a non-reactive lead powder containing a preponderant quantity of free metallic lead comprising grinding lead pieces by attrition, controlling the amount of air permitted to pass in contact with the mass, and controlling the flow of air about the mass in non-contacting relation therewith to reduce the temperature beyond the degree at which oxidation of the mass will occur with rapidity.

8. The method of making a non-reactive lead powder comprising grinding lead pieces in a rotating mill, controlling the access of air to the lead and passing an air current through the mill substantially out of contact with the mass to maintain the temperature below the point at which rapid oxidation of the lead will occur.

9. The method of making a non-reactive lead powder comprising grinding lead pieces by attrition in a rotating cylinder, regulating the quantity of air having access to the lead, and cooling the atmosphere in and about the rotating cylinder to compensate for the heat generated by friction so as to maintain the temperature below the point at which preponderant oxidation of the lead will occur.

10. The method of making a lead powder comprising grinding off particles of lead by attrition in the presence of a controllable quantity of a gaseous medium and maintaining the temperature at a degree at which oxidation of the lead will be subordinated with respect to the formation of metallic lead powder whereby the resultant product will be inert and chemically non-reactive.

In testimony whereof I affix my signature.

RUFUS N. CHAMBERLAIN.